United States Patent [19]

Lemmon

[11] Patent Number: 4,664,144

[45] Date of Patent: May 12, 1987

[54] FUEL RECOVERY SYSTEM FOR DUAL TANKS

[75] Inventor: Norman F. Lemmon, Cedar Falls, Iowa

[73] Assignee: Deere & Company, Moline, Ill.

[21] Appl. No.: 851,998

[22] Filed: Apr. 14, 1986

[51] Int. Cl.[4] ............................................. F16K 24/00
[52] U.S. Cl. ..................................... 137/571; 137/44; 137/587
[58] Field of Search ................... 137/571, 38, 44, 587; 280/5 R

[56] References Cited

U.S. PATENT DOCUMENTS 2,332,007 10/1943 Parker .................................... 137/44
3,311,183 3/1967 Phillips ................................ 180/54.1
3,610,220 10/1971 Yamanda .............................. 137/571
4,215,719 8/1980 Laar et al. ............................ 137/571
4,288,086 9/1981 Oban et al. ........................... 137/571
4,344,636 8/1982 von der Lely ....................... 137/571
4,605,032 8/1986 Hayashi et al. ........................ 137/44

Primary Examiner—A. Michael Chambers

[57] ABSTRACT

A multiple fuel tank arrangement for maximizing fuel delivery to a vehicle during off level operation. The system has a tank from which fuel is withdrawn and at least one additional tank located at approximately the same level. The tanks are connected by a transfer line and crossover line. The transfer line connects the bottom of the tanks and only allows fuel flow into the fuel withdrawal tank. Openings for the crossover line are positioned such that a large volume of fuel is trapped in the fuel withdrawal tank when the tanks are as different relative elevations during off level operation.

11 Claims, 2 Drawing Figures

FUEL RECOVERY SYSTEM FOR DUAL TANKS

BACKGROUND OF THE INVENTION

1. Field of the Invention

This invention relates to transportable tanks for storing and dispensing liquids. More specifically, this invention relates to a system for withdrawing liquids from multiple storage compartments on board vehicles or equipment.

2. Description of the Prior Art

A variety of vehicles and equipment carry multiple liquid storage compartments that experiences pitch and/or yaw motion during transport. This motion affects the relative liquid level between the compartments and can interfere with liquid removal from the compartments. Common examples of such compartments can be found in agricultural spray equipment and vehicle fuel tank arrangements. The use of multiple fuel tanks or fuel storage compartments on motorized vehicles is well known. In these systems, the multiple compartments or tanks are often horizontally spaced along the axis of the vehicle or on different sides of the vehicle. In order to withdraw fuel from all the compartments, conduits or passageways typically interconnect the compartments. An arrangement of this type is shown in U.S. Pat. No. 3,311,183, issued to Phillips, wherein a large conduit connects a pair of saddle tanks for an agricultural tractor. Phillips teaches the use of a large conduit to connect the bottom of two saddle tanks which allows liquid flow from one compartment to the next. Fuel is then withdrawn from one compartment having a fuel withdrawal line or withdrawal point at its bottom.

Connecting multiple tanks with a single conduit at the bottom of the tanks functions very well as long as the tanks are maintained relatively level. When level, the tanks are all emptied at approximately the same time so that the vehicle can use all available fuel. However, when off-level, a large portion of fuel may be trapped in a portion of the tank inclined below the fuel withdrawal point. Therefore, although plenty of fuel may be available in the tanks, the engine may run out of fuel while the vehicle is operating off-level.

This problem is particularly troublesome for agricultural or industrial vehicles having dual tanks or elongated tanks. These vehicles often operate for extended periods of time in an off-level condition. When operating off-level, the tank geometry can greatly reduce the volume of available fuel. This situation affects single compartmentalized tanks or multiple tanks and occurs with a forward and back or sideways angle of the inclination.

Looking specifically at tractors, these vehicles are often used on hillsides and operate for long periods of time while tipped to one side. As a tractor continues to move back and forth on a slope, the angle will be reversed when the tractor reaches the end of a pass and begins its way back. A number of tractors use saddle tanks mounted crosswise on opposite sides of the tractor as shown in U.S. Pat. No. 3,311,183. Fuel is withdrawn from the bottom of one of the tanks at a point closest to the tractor body. Thus, when off-level operation raises the tank having the fuel withdrawal nozzle, a large quantity of fuel can be trapped in the other side tank below the level of the fuel withdrawal inlet. Depending on the tank geometry and incline, it is possible for the tractor engine to run out of fuel with as much as ¼ or more of the total fuel volume still remaining in the tanks.

A dual tank arrangement designed to provide complete fuel recovery is shown in U.S. Pat. No. 4,288,086 issued to Oben et al. In this arrangement, a pump transfers fuel from the bottom of an auxiliary tank to the top of a main tank in response to a signal from a level sensor in the main tank. Fuel for the engine is withdrawn from the bottom of the main tank. Although the '086 invention can provide additional fuel utilization during off-level operation, the pump and level sensor adds complexity to the fuel system. In addition, the pump will sequentially empty the tanks which, particularly in a side mounted tank arrangement, unbalances the vehicle.

It is an object of this invention to provide a tank assembly for liquid storage that will increase the quantity of fuel available for withdrawal during off-level operation without the addition of pumps or sensors.

It is a further object of this invention to provide a dual fuel tank arrangement with increased fuel availability during off-level operation that will limit the load imbalance imposed on the vehicle.

A yet further object of this invention is to provide a tractor side tank assembly that will minimize the amount of fuel that is not withdrawable from the fuel tanks during off level operation of the vehicle.

SUMMARY OF THE INVENTION

These objects and embodiments are achieved by a tank assembly for storing liquids having means for communicating liquid between at least two liquid storage compartments arranged to trap a predetermined quantity of liquid in one of the compartments as the assembly is periodically tipped. The compartment in which liquid is trapped has means for withdrawing fuel from the assembly.

More specifically, this invention is directed to a fuel tank assembly for liquid fuel that has first and second horizontally arranged fuel compartments. One of the compartments contains a withdrawal point for withdrawing fuel from the tank assembly. A first passageway communicates the two compartments across a first set of connection points and only allows the transfer of liquid into the compartment containing the fuel withdrawal point. A second passageway communicates the two fuel compartments across a second set of connection points, wherein the connection point for the second passageway is above the connection point for the first passageway in the fuel compartment containing the withdrawal point. Both compartments are vented to allow free transfer of liquid between the two compartments. The volume of fuel trapped in the compartment from which fuel is withdrawn is determined by the location of the second passageway connection above the first passageway connection. The second passageway also serves to return fuel in excess of the desired retained volume to the other tank when the vehicle is restored to level operation. Other details, objects and embodiments of this invention will become apparent from the following detailed description of the invention.

DESCRIPTION OF THE PREFERRED EMBODIMENT

Figure 1:
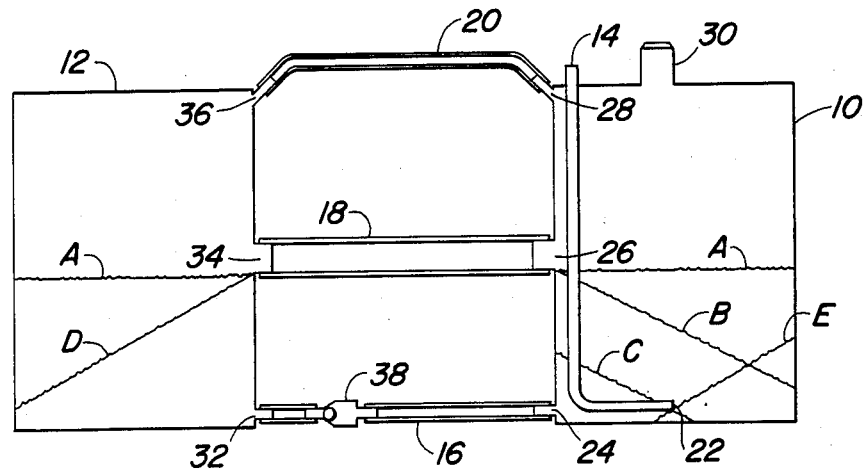
FIG. 1 show a cross sectional view of a pair of horizontally spaced fuel tanks arranged in accordance with this invention.

The figures show a fuel tank arrangement with various interconnecting lines therebetween. The arrangement consists of a right fuel compartment or tank 10, a left fuel compartment or tank 12, a fuel withdrawal line 14, a crossover line 18, a transfer line 16, and a vent line 20. This tank arrangement would be typically mounted on a tractor (now shown) with each tank on an opposite side of the tractor body.

Looking in more detail at the fuel tanks, fuel withdrawal line 14 is routed from the top of the tank 10 down to the tank bottom and has an inlet opening 22 centered in the bottom of the tank. The upper end of fuel inlet line 14 is connected to a fuel pump (not shown). Another opening 24 is located at the bottom of the tank and connects the tank to transfer line 16. At approximately its midpoint, tank 10 has another opening 26 which is connected to crossover line 18. The top of tank 10 contains a vent opening 28 which is connected to vent line 20 and a fuel filler neck 30 by which fuel is added to both tanks 10 and 12.

Left tank 12 has the same size and configuration as right tank 10 and the same elevation when the tanks are in a level position. Left tank 12 also contains a transfer line opening 32, a crossover line opening 34, and a vent opening 36 at its bottom, midpoint and top locations, respectively.

Transfer line 16 connects crossover line openings 24 and 32. A low pressure or zero pressure check valve 38 only allows fluid flow from the left tank 12 to the right tank 10.

Crossover line 18 connects crossover line openings 26 and 34. Crossover line 18 has a much larger diameter than transfer line 16. The large diameter of crossover line 18 allows a rapid transfer of fuel between the tanks whenever the liquid level in one tank is higher than the other and the level is above the crossover line openings. Preferably, crossover line 18 will have a much greater flow area than transfer line 16.

Openings 28 and 36 are connected by vent line 20. Vent line 20 connects the two tanks to allow rapid air transfer so that liquid may flow freely from one tank to another. The purpose of vent line 20 can also be served by open vents at the top of each tank.

OPERATION

In order to clarify the function of the crossover line and transfer line as the tanks go from a level to alternate off-level positions, the function of these lines will be described in relation to the fuel level within the tank as the relative tank levels change.

Looking first at level operation, the liquid level in the two tanks will remain the same as long as the tanks are kept relatively level. With the tanks level, and relatively full, fuel withdrawal by line 14 results in simultaneous transfer of fuel from the left tank 12 to the right tank 10 through crossover line 18 and transfer line 16 until the fuel supply reaches the level indicated by the letter A. If fuel is withdrawn below level A, and the tanks remain level, fuel is carried from tank 12 to tank 10 along transfer line 16. As fuel is withdrawn from the tanks, air is vented in by nozzle 30 to prevent a vacuum from developing in the tanks. Vent air in right tank 10 passes to left tank 36 through vent passage 20. When the fuel level is below the top of the crossover line openings, the crossover line, can also serve as a vent passage. In the level position, fuel withdrawal can continue until substantially all of the fuel has been removed from the tanks.

During off level operation, fuel moves back and forth between the tanks through crossover line 18 as the tractor tips from side to side. As long as the tanks are relatively full, ample fuel is available for withdrawal from the right tank and the system operates like prior art fuel systems having a single crossover line at the bottom of the tanks. However, when the fuel volume decreases to approximately level A, the transfer line and check valve function to admit and retain a minimum quantity of fuel in the right tank.

Considering then a cycle of alternate off level operation with the fuel volume at or below level A, upward tipping of right tank 10 relative to left tank 12, causes fuel to flows through crossover line 18 into the left tank. Nevertheless, a volume of fuel indicated by line B is still retained in right tank 10 by virtue of the distance between opening 26 and on the bottom of tank 10, and check valve 38 which prevents flow from the right to the left tank through transfer line 16. The region between lines A and B represent the maximum volume of fuel passing to the left tank as the tanks are tipped and line B becomes level. Retained fuel can be withdrawn through inlet opening 22 until the fuel volume reaches level C. For most arrangements and operations, the volume of fuel between lines B and C would not be expended before the tractor returned to a level or opposite off-level position.

As the tractor returns to a level position, any fuel in the left tank above line A returns to the right tank via crossover line 18 and transfer line 16. As the fuel level goes below line A, fuel is still transferred through line 16 to keep the liquid level in tank 12 at or below the level in tank 10. Tilting the left tank upward until line D is level transfers the volume of fuel above line D to the right tank via the crossover and transfer lines. When fuel can no longer pass through crossover line 18, it continues to flow from the left tank to the right tank through transfer line 16. As long as the left tank is raised or level relative to the right tank fuel flow out of the left tank will continue until it is empty. If the left tank remains raised, fuel delivery to the tractor engine stops when fuel reaches the level of line E.

Therefore, as the tractor continues to operate between level and off-level or alternate off-level positions, fuel will be supplied and withdrawn from the lower portion of right hand tank 10 until it reaches a minimum level indicated by lines E or C. The rate of fuel transfer between tank 12 and tank 10 when the fuel is below the level of crossover line opening 26 is determined by the flow area of transfer line 16. Line 16 should be sized to transfer fuel at least twice the volumetric rate of fuel withdrawal from line 14. Sizing for twice the withdrawal rate will store approximately enough fuel in the right hand tank, when it is tipped downward, to allow the tractor to operate with the right tank tipped upward for an equal period of time. Preferably, crossover line 18 and both of its openings are located approximately midway along the elevation of the tanks. This location allows the right tank to retain ample fuel when it is tipped upward while limiting the difference in fuel volumes between the two tanks to minimize any imbalance in fuel loading.

Figure 2:
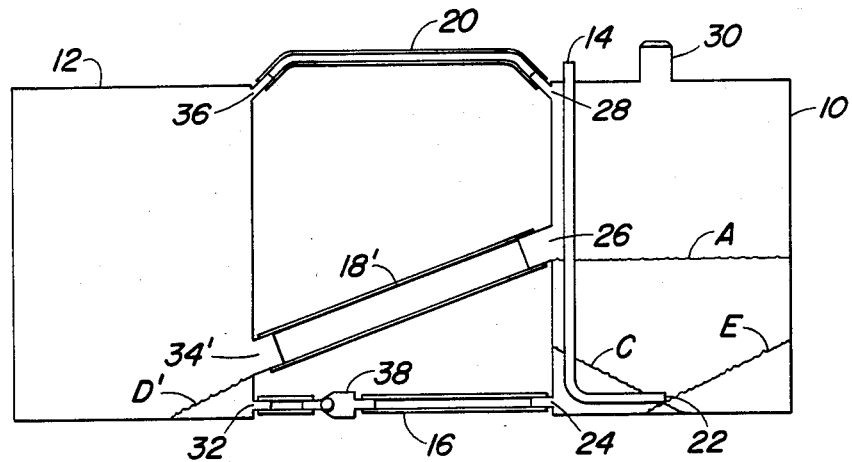
FIG. 2 show an alternate embodiment of the fuel tank arrangement of FIG. 1.

Alternately, line 18 can be positioned, as show in FIG. 2, to rapidly transfer fuel from the left tank to the right tank when tank 12 is raised. By arranging the crossover line in the inclined position indicated by 18' and moving crossover line opening 34 down to position 34', fuel will continue to pass through the crossover line when the fuel level is below line D'. With the crossover line in position 18', raising left hand tank 12 will quickly replenish the volume of retained fuel in right hand tank 10.

While this invention has been described in conjunction with a specific embodiment, those skilled in the art are aware of other embodiments, alternatives and variations that may be practiced in utilizing this invention. For example a single fuel tank arrangement having a multiplicity of baffles to define a series of compartments could also benefit by interconnecting the compartments in accordance with the teachings of this invention. In such an arrangement the withdrawal compartment could be located centrally or to one end of the tank. Accordingly, this invention is not limited to the particular details disclosed herein, but only by the scope of the appended claims.

What is claimed is:

1. A tank assembly for storing and supplying liquid said assembly comprising:
   a supply compartment for storing liquid having means for withdrawing liquid from said assembly;
   at least one additional liquid storage compartment;
   means for establishing one way communication of liquid from each of said additional storage compartment to said supply compartment below a common elevation of said compartments; and
   means for bidirectionally communicating liquid between said supply compartment and said additional storage compartments above said common elevation.

2. A fuel tank assembly for liquid fuel comprising:
   first and second horizontally arranged fuel compartments;
   means in direct communication with said first compartment for withdrawing fuel from said assembly;
   a first passageway having an inlet in said second compartment and an outlet in said first compartment;
   means for preventing liquid flow from said first compartment to said second compartment through said first passageway;
   a second passageway for communicating liquid between a first point in said first compartment and a second point in said second compartment, said first point being located above said outlet; and
   means for venting said compartments to allow free flow of liquid therebetween.

3. The fuel tank assembly of claim 2 wherein said fuel withdrawal means has a fuel withdrawal point centered at the bottom of the first compartment.

4. The fuel tank assembly of claim 2 wherein said first point is at or above the vertical midpoint of the first compartment and said second point is at or below the vertical midpoint of the second compartment.

5. The assembly of claim 2 wherein said second passageway is larger than said first passageway.

6. A dual fuel tank arrangement for liquid fuel comprising:
   first and second fuel tanks spaced horizontally apart, each tank having a transfer opening at its bottom, said first tank also having a crossover opening above its transfer opening and said second tank also having a crossover opening at or below its vertical midpoint;
   a first passageway connecting the transfer openings and having means for preventing liquid flow from said first tank to said second tank;
   a second passageway connecting the crossover openings;
   a fuel withdrawal point at the bottom of said first tank for removing liquid from said tanks; and
   means for venting the tanks to allow free flow of liquid between said tanks.

7. The arrangement of claim 6 wherein said fuel withdrawal point is horizontally centered in the bottom of said first tank and said second passageway has a substantially larger flow area than said first passageway.

8. The arrangement of claim 6 wherein the crossover openings of the first tank is located at the vertical midpoint of the first tank and the crossover opening of the second tank is located in the lower third of the second tank.

9. A liquid fuel withdrawal system for a pair of fuel tanks spaced symmetrically about a vertical axis, said system comprising:
   a fuel withdrawal line with its inlet end centered at the bottom of a first tank of said pair;
   a transfer line having one end in communication with the bottom of said first tank and its other end in communication with the bottom of a second tank of said pair;
   a check valve across said transfer line blocking liquid flow from said first tank to said second tank;
   a crossover line in communication at opposite ends with said first and second tanks and located above said transfer line; and
   a vent line in communication at opposite ends with the tops of said first and second tanks.

10. The system of claim 9 wherein said crossover line and said transfer line are substantially horizontal.

11. The system of claim 9 wherein said transfer line is horizontal and said crossover line slants downward from said first tank to said second tank.

* * * * *